Patented Jan. 12, 1932

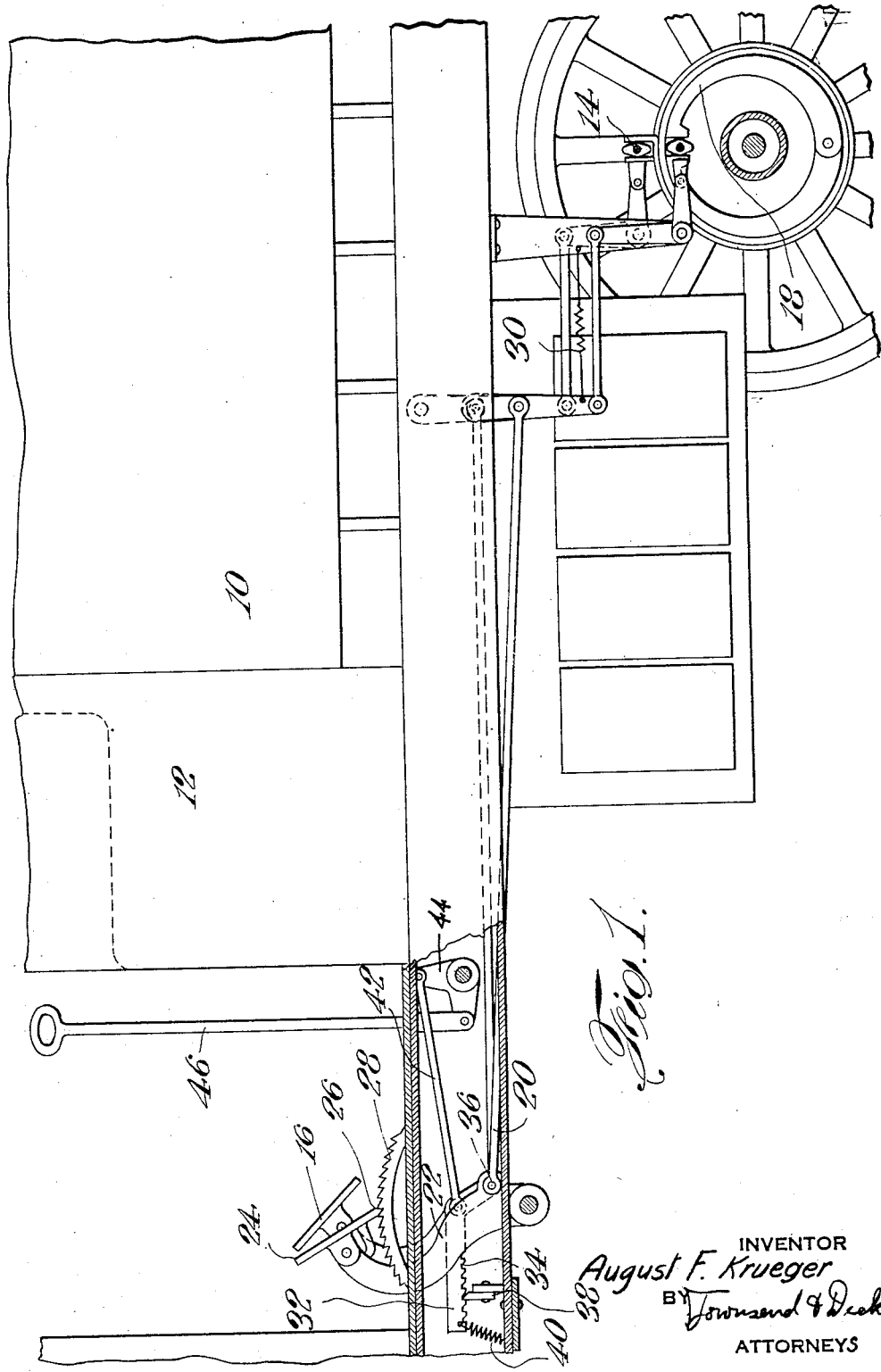

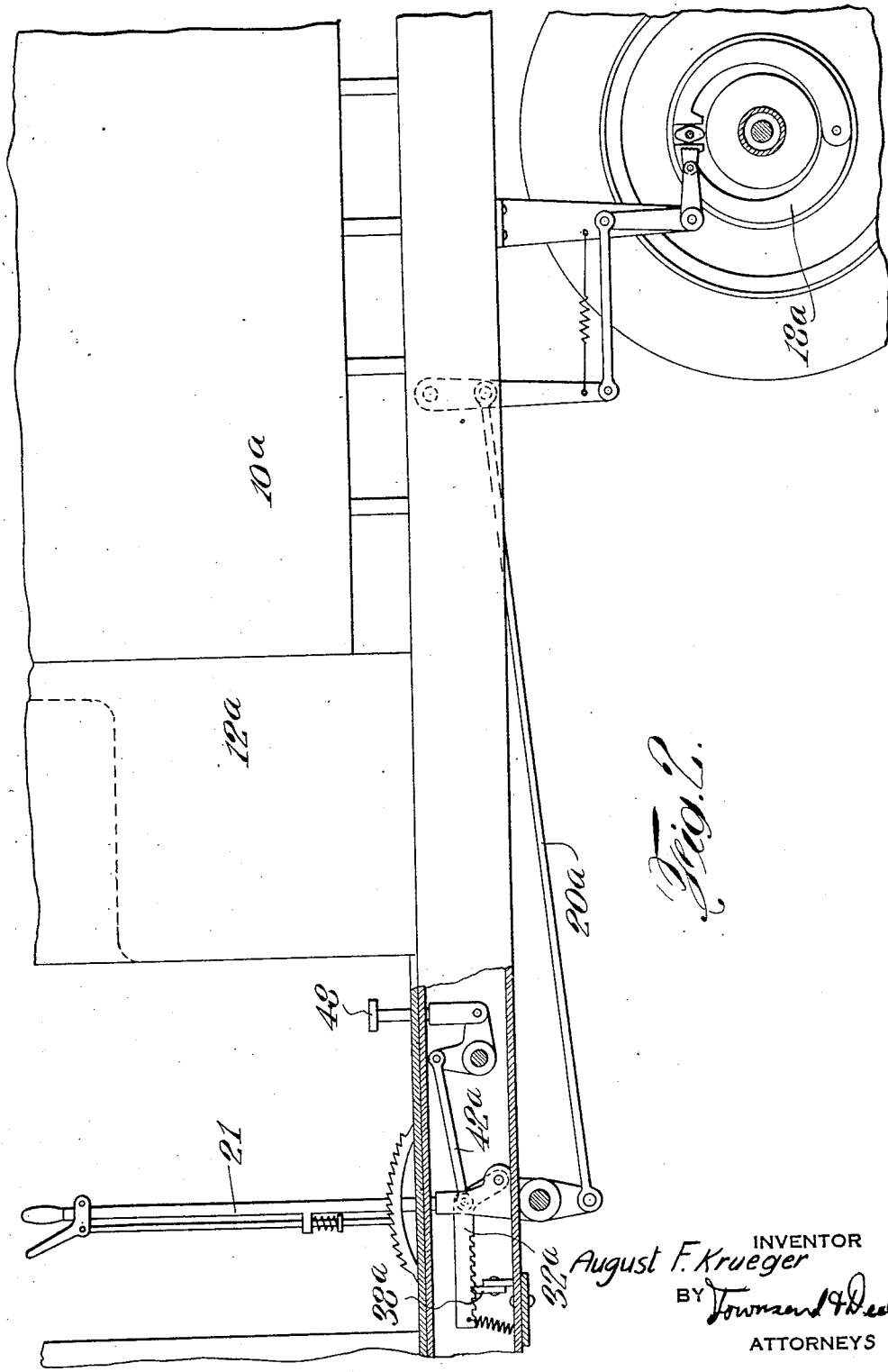

1,840,960

UNITED STATES PATENT OFFICE

AUGUST F. KRUEGER, OF BROOKLYN, NEW YORK, ASSIGNOR TO THE PILGRIM STEAM LAUNDRY COMPANY, OF BROOKLYN, NEW YORK, A CORPORATION OF NEW YORK

SAFETY BRAKE FOR VEHICLES

Application filed August 27, 1929. Serial No. 383,662.

This invention relates to improvements in vehicle brakes.

It is a primary object of the invention to provide an auxiliary lock for emergency brakes to prevent the brake from being released in the usual manner on the release of the brake-holding apparatus.

The above and other objects will appear more fully from the following description when considered in connection with the drawings in which:

Fig. 1 is an elevational view, parts being in section, of a vehicle supplied with one form of my invention.

Fig. 2 is a similar view of a slight modification.

In vehicle brakes as heretofore constructed, particularly vehicles such as electric delivery trucks which the driver customarily leaves unattended while delivering articles, there has been the constant difficulty that some unauthorized person, for example a child, may accidentally or maliciously release the brake and permit the vehicle to coast down hill with the attendant probabilities of danger to the truck or persons or property in the path of travel. The present invention overcomes the above difficulties by providing a separate brake control member which must be released independently of the usual brake releasing devices before it is possible to move the vehicle.

Referring to the details of the drawings, there is shown in Fig. 1 a vehicle 10 shown as an electric delivery truck provided with a usual driver's seat 12. The vehicle is provided with the usual service brake 14 connected by suitable linkage to the foot pedal 16.

A second brake 18 is connected by suitable linkage 20 to the brake pedal 22. This brake is customarily known as the emergency brake and, in the form shown, includes a tiltable foot pedal 24 having portions 26 engageable with the teeth of the duplicate rack bars 28 to lock the brake in any position to which it is moved. The brake lever 22 may be released through pressure on the pedal 24 after which the pedal may be tilted to a non-locking position and the brake released. The emergency brake lever 22 is normally retained in inactive position by the usual devices shown for example as a return spring 30.

In applying my invention to the vehicle brakes described above I provide a rack 32 formed with teeth 34 and pivotally supported as at 36 on the lever 22. The rack teeth 34 are constructed to successively engage a fixed stop member 38 suitably supported on the vehicle frame and effective to maintain the rack bar 32 and lever 22 in any position to which the same may be moved. The teeth 34 and 28 are preferably co-ordinated so that the engagement lugs on the pedal 24 will engage a tooth 28 at the same point that one of the teeth 34 engages behind the stop 38 and to this end stop 38 may be made adjustable if desired. A retaining spring 40 serves to retain the teeth 34 normally in engagement with the stop 38.

Since the locking engagement between the teeth 34 and stop 38 is of an emergency nature and intended to be released only by authorized persons, the pivot 36 for the rack bar 32 is positioned beneath the plane of the teeth 34 so that on elevation of the bar 32 the teeth 34 tend to move rearwardly and upwardly. This construction requires a predetermined application of pressure to the pedal 22 before the rack bar can be elevated and the brake released.

The release of the bar 32 is effected, after the initial pressure has been applied to the lever 22, by means of the link 42, bell crank lever 44 and manual control member 46. The latter is preferably positioned at a point remote from the brake pedal 24 and having no apparent connection with the same since the linkage for the brake and releasing devices is all beneath the floor of the vehicle. As shown the hand lever 46 is positioned closely adjacent to the driver's seat 12, although the lever may be positioned either in front of the seat, as shown, or beside the same, or in any other position convenient for operation by the car operator.

In the use of the above apparatus the service brake 16 may be applied and released at any time in the usual manner. The emergency brake may be applied through pressure on the foot pedal 24 and the same latched in any applied position by suitably tilting the latch pedal 24. The forward movement of the emergency brake lever 22, however, carries with it the rack bar 32 with the result that the lever 22 is independently locked in its forward or applied position by means of the rack teeth 34 and stop 38. If any unauthorized person should attempt to release the brake through manipulation of the foot pedal 24 such efforts will be unsuccessful due to the locking effect of the rack bar 34. To release the brake it is necessary to apply a certain pressure to the brake pedal 24 so that this pedal can be tilted to its inactive position. At this time the rack teeth 34 are released from their engagement with the stop 38 and the operator may move the handle 46 upwardly and free the emergency brake for movement to non-braking position.

In Fig. 2 I have shown my invention as applied to a usual emergency brake for an automobile 10a as distinguished from the foot emergency brake described above for electric delivery trucks. In Fig. 2 the emergency brake lever 21 is provided with self-latching means for retaining the same in any fixed position. The lever 21 is connected by links 20a to the emergency brake 18a of any preferred type.

The auxiliary locking device includes a movable rack bar 32a similar to the rack bar 32 and formed with teeth for engagement with a fixed stop 38a so that the emergency brake will be held applied to any extent to which the same is operated. The rack bar 32a is released by links 42a extending from bar 32a to a suitable lever operated by the emergency release lever shown as a foot pedal 48. The pedal 48 is remote from the hand lever 21 and without any apparent connection to the same so as to give no suggestion to anyone unacquainted with the mechanism that it requires the actuation of the foot pedal 48 before the emergency brake can be released. The pedal 48, as shown. is placed in front of and near the driver's seat 12a.

The operation of the second form of the invention is the same as that described above in connection with Fig. 1 and will need no additional description.

Having now described my invention, I claim:

1. In combination, a vehicle brake, an operating member including means for applying said brake and locking the same in the applied condition, auxiliary means associated with said brake for locking the same in the applied condition and means for automatically applying said auxiliary locking means on applying said brake.

2. In combination with a vehicle, an emergency brake therefor, a brake lever provided with manually controlled releasable locking mechanism for applying said brake and maintaining the same applied, an auxiliary lock for said brake operative to maintain the same in applied position, means for automatically applying said auxiliary lock on applying said brake, a releasing handle for said auxiliary lock positioned remote from said brake lever and operative to release said auxiliary lock.

3. In combination with a vehicle, an emergency brake therefor, a return spring for said brake, a brake lever provided with manually controlled releasable locking mechanism for applying said brake and maintaining the same applied, an auxiliary lock for said brake operative to hold said brake in applied position, said auxiliary lock including a movable locking element normally held in locked position by the power of said return spring, and means for automatically applying said auxiliary lock coincidently with the application of said emergency brake.

4. In combination with a vehicle, an emergency brake therefor, manually controlled releasable locking mechanism for applying said brake and maintaining the same applied, an auxiliary lock for said brake operative to maintain said brake in applied position, and means for automatically applying said auxiliary lock coincidently with the application of said emergency brake, said auxiliary lock including a movable locking element and a coacting relatively fixed element, said elements being constructed to require the further application of said brake before said elements can be disassociated and said auxiliary lock unlocked.

5. In combination with a vehicle provided with an operator's seat, a brake for said vehicle, a brake applying lever positioned substantially in advance of said seat and provided with locking devices for maintaining the same in applied position, and auxiliary locking mechanism for maintaining said brake applied, and means for automatically applying said auxiliary lock coincidently with the application of said emergency brake, means for releasing said auxiliary lock, said last-named means including a control member positioned remote from said brake applying lever and adjacent said operator's seat.

6. In combination with a vehicle provided with an operator's seat, a brake for said vehicle, a brake applying foot lever positioned substantially in advance of said seat and provided with foot released locking devices for maintaining the same in applied position, an auxiliary locking mechanism for maintaining said brake applied, means for automatically applying said locking mechanism coincidently with the application of said brake, means for releasing said auxiliary lock, said last-named means including a hand actuated control member positioned remote from said brake applying lever and adjacent said operator's seat.

7. In combination with a vehicle, a brake for said vehicle, a brake applying foot lever provided with foot released locking devices for maintaining the same in applied position, an auxiliary locking mechanism for maintaining said brake applied, means for automatically applying said auxiliary locking mechanism coincidently with the application of said brake, means for releasing said auxiliary locking mechanism, said last-named means including a hand actuated control member positioned remote from said brake applying lever and means connecting said hand actuated member with said auxiliary locking mechanism, the release of said auxiliary locking mechanism and the movement thereof to unlocked position requiring a predetermined forward movement of said brake applying lever.

Signed at New York, in the county of New York and State of New York, this 26th day of August, A. D. 1929.

AUGUST F. KRUEGER.